United States Patent [19]

Leis et al.

[11] 4,321,632
[45] Mar. 23, 1982

[54] POSITIONING SYSTEM AND FORMATTING SCHEME FOR MAGNETIC TAPE MEDIA

[75] Inventors: Michael D. Leis, Framingham; Robert C. Rose, Hudson, both of Mass.

[73] Assignee: Digital Equipment Corporation, Maynard, Mass.

[21] Appl. No.: 148,055

[22] Filed: May 19, 1980

Related U.S. Application Data

[63] Continuation of Ser. No. 44,680, Jun. 1, 1979.

[51] Int. Cl.$^3$ .................... G11B 5/09; G11B 15/18; G11B 15/48
[52] U.S. Cl. .................................... 360/49; 360/50; 360/72.2; 360/74.4
[58] Field of Search .................. 360/72.2, 74.4, 49, 360/50

[56] References Cited

U.S. PATENT DOCUMENTS

| | | | |
|---|---|---|---|
| 3,387,293 | 6/1968 | Stockebrand | 360/74.4 |
| 3,681,524 | 8/1972 | Nicholls | 360/49 |
| 3,879,752 | 4/1975 | Heidecker | 360/49 |
| 3,987,484 | 10/1976 | Bosche et al. | 360/72.2 |
| 4,000,518 | 12/1976 | Stearns | 360/74.4 |

FOREIGN PATENT DOCUMENTS 1109423  1/1964  United Kingdom .............. 360/74.4

Primary Examiner—Vincent P. Canney
Attorney, Agent, or Firm—Cesari & McKenna

[57] ABSTRACT

A positioning system for a magnetic tape system that utilizes a multiple record recording format wherein positioning data that marks the beginning of record segments, the beginning of the tape medium, and the ending of the tape medium are pre-recorded at one-fourth of the bit density of work data so that positioning data may be more accurately read at a higher tape speed during a record seek mode of operation. The system also includes detector circuitry that is enabled only upon detecting positioning data and that identifies the positioning data as an inter-record mark signal, beginning of tape signal, or an ending of tape signal. A tape drive controller is responsive to the detection circuitry for controlling the speed and direction of the magnetic tape.

6 Claims, 15 Drawing Figures

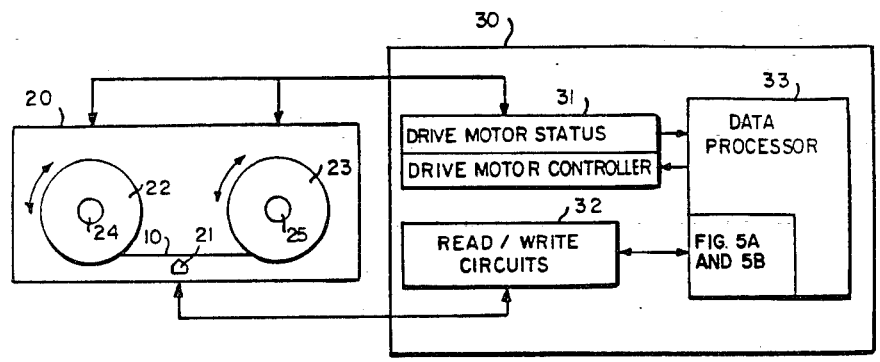
FIG. 1
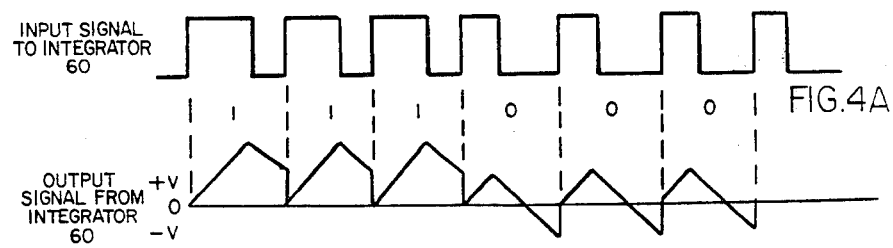
FIG. 4A
FIG. 4B

POSITIONING SYSTEM AND FORMATTING SCHEME FOR MAGNETIC TAPE MEDIA

CROSS REFERENCES TO RELATED APPLICATIONS AND PUBLICATIONS

This application is a continuation of U.S. patent application Ser. No. 044,680 filed by Robert C. Rose and Michael D. Leis on June 1, 1979 for a Positioning System and Formatting Scheme fo Magnetic Tape Media, which application is assigned to the same assignee of this invention.

TU58 DECtape II User's Guide, Digital Equipment Corp., October, 1978.

BACKGROUND OF THE INVENTION

The invention is related to magnetic tape storage systems for use in data processing systems. More specifically, the invention is concerned with a magnetic tape formatting scheme for facilitating the positioning of read/write heads at a desired location along a tape that carries a magnetic storage medium and the associated logic circuitry for detecting the physical ends of the tape and the location of data records along the tape.

A typicl magnetic tape storage system includes at least four essential and basic components: namely, a magnetic tape, a tape transport, data transfer circuitry and control circuitry. The magnetic tape generally comprises a flexible tape-like plastic strip having a thin coating of ferromagnetic material along the surface thereof as a storage medium. The tape transport moves the tape between supporting reels, or spools, in a forward or reverse direction past one or more associated read/write heads in the data transfer circuitry. The data transfer circuitry receives signals from the reading heads and converts them into binary signals for transfer to the data processing system and converts binary signals received from the data processing system into signals for energizing the writing heads thereby to store information on the magnetic tape. The control circuitry responds to commands from the data processing system to control the operation of the other components.

This invention is particularly adapted to a class of magnetic tape storage devices in which the tape transport may be driven in a fast access, or "seek", mode for the purposes of positioning a desired record at the read/write heads and in a slower, "read/write", mode during data transfer operations that enable data to be read from or written onto the magnetic tape. In such magnetic tape storage systems, efforts are made to achieve optimum performance in both the seek and the read/write modes. Specifically, it is desired to achieve a maximum spatial signal, or bit, density along the tape for signals that represent the data to be stored and various control information in order to maximize the storage capacity of the tape. However, in practice the maximum density that can be achieved is established by several conflicting operating criteria. For example, while increasing signal density increases the data transfer rate for a given tape speed, the probability of errors during data transfers also increases. It also is desirable to minimize record searching times during the seek mode as no data is being transferred. The faster transport rate achieves this objective, but many times at a rate that exceeds the bandwidth of the data transfer circuits.

Several magnetic tape storage systems utilize prerecorded formats on the magnetic tape to facilitate the operation of systems which have both seeking and read/write modes.

One such formatting scheme is shown in U.S. Pat. No. 3,387,293. In accordance with the description in that patent, the magnetic tape has plural, parallel tracks. One track, a mark track, contains prerecorded formatting information; another track is a timing track that contains timing information. The mark track defines different areas along the tape including end zones at the physical ends of the tapes and a plurality of intermediate blocks. Each block comprises contiguous frames including plural frames in the middle portion of each block for storing data. In a block the frames on either side of the data frames contain positioning information and control information that facilitate the operation of the system during a seeking mode and during a read/write mode.

More specifically, control circuitry utilizes positioning information associated with each block to relatively position the tape medium with respect to the read/write heads. This control circuitry and data transfer circuitry may also include detectors for detecting the end zones corresponding to the physical ends of the magnetic tape and the boundaries of adjacent blocks. Additionally, some magnetic tape systems may further incorporate switching and buffering circuitry for improving the data transfer characteristics between the magnetic tape storage system and the data processing system to which it connects.

Another formatted arrangement is depicted in U.S. Pat. No. 3,879,752 that discloses a tape or disk medium in which incoming data from the storage medium contains binary data in discrete records, or blocks, and sector information defining the boundaries between adjacent records or blocks. The sector information is stored at a frequency which is greater than the maximum frequency of the signal produced by the binary data. A frequency discriminating circuit detects the occurrence of each burst of higher frequency signal, thereby to indicate that an area of sector has passed the read/write heads, and generates a sector pulse. Other circuitry uses the sector pulse for ascertaining the position of the medium. Apparently, however, this formatting is limited to a medium that travels at a constant speed as the frequency of the sector information signal is dependent upon the velocity of the medium. Doubling the velocity would double the frequency of the sector information signal. Moreover this invention is disclosed as being applicable to both tape and disk media, and disk media are constant speed devices.

One disadvantage of the first formatting scheme is its inefficient use of the overall data storage capacity of the recording medium and the additional read circuitry required to reach each of the timing and mark tracks simultaneously with the data track. A similar system incorporates an optical detector in conjunction with transparent or reflective markers disposed at the physical ends of the magnetic tape. The tape may incorporate a reflective metal element on its surface, have its oxide coating absent at a portion thereof, or possess an arrangement of holes that pass light therethrough. In such a system, the control circuitry knows, directly or indirectly, whether the tape transport has reached the beginning or ending of the magnetic tape and thereby causes the tape control circuitry to take appropriate control action. Expensive optical detectors and associated logic circuitry are obvious disadvantages of this method.

3

Another system incorporates a null signal area, or "gap", as a boundary between adjacent records to identify inter-record positions. When a predetermined threshold signal level is not exceeded by the signal from the read heads, the system assumes that an inter-record position is passing the read/write heads. This method is limited by noise factors concommitant with the transfer of low level electrical signals generally associated with transducers. Thus, the data transfer circuitry becomes more complicated because it must have the capability of discriminating noise signals from valid signals. When multiple speeds are used, either different transducers or different threshold signal levels must generally be employed to sense position data at the relatively higher tape speed. All of these factors increase the costs of the storage system.

SUMMARY

Therefore it is an object of this invention to overcome the problems generally associated with the identification of inter-record positions along a magnetic tape and the positions of the physical ends of the magnetic tape.

Another object of this invention is to provide a magnetic tape data storage system that minimizes the time for accessing non-sequential record segments by providing reliable detection of data boundaries at high speeds of operation.

Another object of this invention is to provide a magnetic recording medium with no gaps of unrecorded data between record segments thereby permitting the use of simplified data transfer circuits for detecting signals from the read/write heads.

Another object of this invention is to provide a magnetic tape storage system for a data processing system including magnetic tape for data storage in which the discrimination of boundaries between adjacent records is facilitated.

In accordance with one aspect of this invention, a tape for use in a magnetic tape storage system comprises a sequence of records that are recorded at a first spatial bit density along the length of the tape. Inter-record marks between adjacent records act as record boundaries and are recorded at a second spatial bit density that is less than the first bit density. Detection circuitry generates a signal indicating whether the tape passing read/write heads is recorded in the first or second spatial bit density. Other circuitry discriminates the inter-record marks from beginning-of-tape and end-of-tape marks that also are recorded at the second spatial bit density. This detection circuitry operates during both a read/write mode when the tape moves at a first speed that optimizes reliable data transfers and at a second, higher, speed when the tape is being positioned and no data is being transferred.

The invention is pointed out with particularity in the appended claims. The above and further objects and advantages of the invention will be better understood by referring to the following description taken in conjunction with the accompanying drawings.

BRIEF DESCRIPTION OF THE DRAWINGS

FIG. 1 illustrates the general arrangement of the basic components of a magnetic tape storage system;

FIGS. 4A and 4B show an example of input and output signals associated with an integrator for an illustrative bit pattern;

DESCRIPTION OF AN ILLUSTRATIVE EMBODIMENT

Referring to FIG. 1, this invention is particularly adapted for use with a magnetic tape storage system that records data on a magnetic tape 10. The organization, or format, of the magnetic tape is more clearly shown in FIGS. 2A and 2B. An understanding of this format will facilitate an understanding of various aspects of this invention.

Figure 2A:
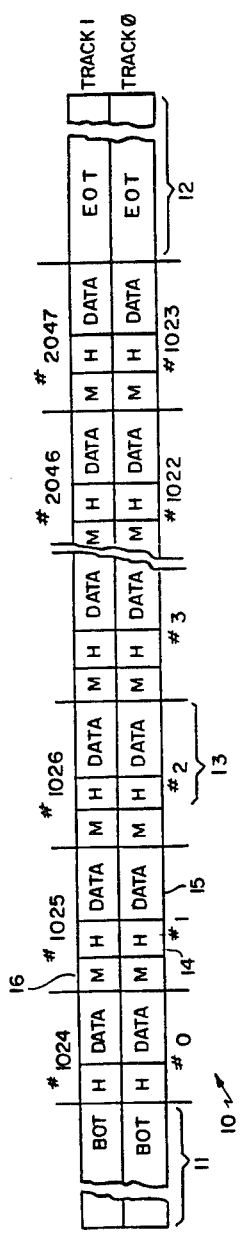
FIG. 2A depicts a preferred format of work data and positioning information of a magnetic tape medium incorporated in this invention.
Figure 2B:
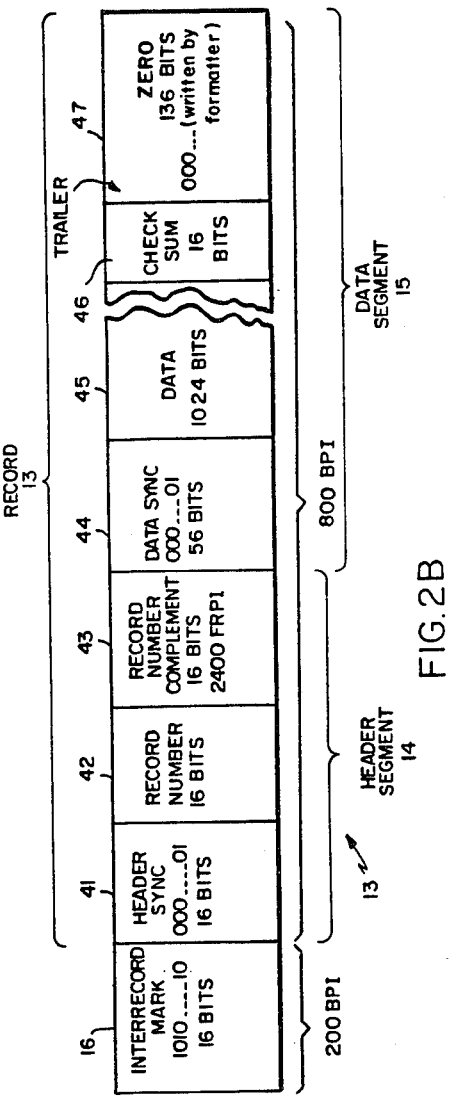
FIG. 2B depicts a more detailed data arrangement of one record segment of the magnetic tape medium shown in FIG. 2A.

Referring now to FIGS. 2A and 2B, in a preferred format the magnetic tape 10 comprises two tracks (TRACK 0 and TRACK 1) of identical format structure, but with different record numbers in the header segments. In FIG. 2A it is assumed that the "beginning" of the tape is at the left end of the tape as shown and that the "ending" is at the right end. Each track contains a mark at each physical end of each track. The mark at the left end of each track is called a beginning-of-tape (BOT) mark 11 while the mark in each track at the right end is called an end-of-tape (EOT) mark 12.

A plurality of records 13 lie along each track between the BOT mark 11 and the EOT mark 12. Each record 13 comprises a plurality of segments including a header (H) segment 14, and a DATA segment 15. The DATA segment 15 stores processing data that is processed, altered, or written by the magnetic tape system. An interrecord (M) mark 16 is positioned between each pair of adjacent records, and each interrecord mark 16 thereby serves as a boundary between adjacent records. In this specific embodiment the tape is prerecorded with the various marks and records, and they are contiguous; that is, there are no significant gaps between adjacent records 13 and any of marks 11, 12 and 16.

Figure 2C:
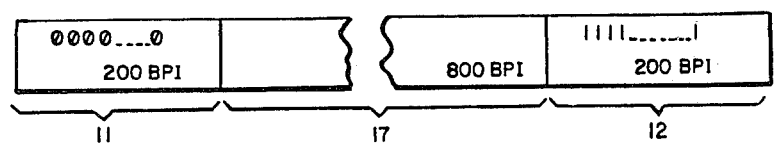
FIG. 2C illustrates a data arrangement of the beginning and ending segments of the magnetic tape recording medium.

Each of the BOT mark 11, the EOT mark 12 and interrecord mark 16 is recorded at a frequency that establishes a spatial bit density along the track of the tape that is less than the spatial bit density of the information recorded in the records 13. In one embodiment the spatial bit density for the marks is 200 bits per inch (bpi) while the spatial bit density for the information in the records is 800 bpi. The difference is also depicted in FIG. 2C with reference numerals 11 and 12 identifying the low density BOT and EOT marks and the reference number 17 depicting the intermediate area that generally is recorded at the higher bit density, except for the interrecord marks that are not shown in FIG. 2C. As described later, this relative bit density between the information stored in the marks 11, 12 and 14 and the information stored in the records enables relatively simple circuitry to discriminate between the marks and the records. The discrimination is also accomplished in a way that simplifies positioning operations, especially in a seek mode.

FIG. 2B illustrates, in more detail, a format for an interrecord mark 16 and a following record 13 including its header segment 14 and data segmet 15. The interrecord mark 16 is recorded as sixteen data bits of alternating ONEs and ZEROes. Again, these bits are recorded at one-fourth the spatial bit density of the header segment 14 and data segment 15. The header segment 14 comprises a header synchronization field 41 that is contiguous the interrecord mark 16. It includes 16 bits of information constituted by 15 ZEROes and a single ONE. The ONE data bit of the header synchronization field 41 conditions read circuitry to read the next 32-bits that are interpreted as a 16-bit record number field 42 and a 16-bit record number complement field 43. The record number, as a prerecorded number, uniquely identifies each record. As shown in FIG. 2A, record numbers 0 through 1023 are formatted on TRACK 0 while record numbers 1024 through 2047 are formatted on TRACK 1 of the tape 10. The complement of the record number provides information for verifying the correctness of the record number; if an error occurs, the tape system can retry or reexecute a record seek command that causes positioning.

Immediately succeeding the record number field 43 is a data synchronization field 44 that comprises 55 "zeroes" followed by a single "one" as a synchronizing bit. This bit conditions read/write circuitry to read or write data from or to the following data field 45 that stores 128 eight-bit bytes of data. A 16-bit check sum field 46 follows the data field 45; this field 46 enables conventional circuitry for verifying the accuracy of the data contained in the data field 45. The check sum field 46 is followed by a series of "zero" information bits that make up a trailer field 47.

Still referring to FIGS. 2A through 2C, the BOT and EOT marks at the ends of the magnetic tape 10 are recorded with representations of predetermined bit patterns that differ from the bit pattern in the interrecord mark 16. Specifically, the BOT mark 11 and EOT mark 12 store representations of all "zeroes" and all "ones", respectively. This arrangement facilitates the detection of the ends of the tape and of the passage of records for tape direction and control purposes.

During operation, circuitry in the magnetic tape storage system receives signals that are recorded on the tape 10. Certain circuitry discriminates high-density and low-density recording areas notwithstanding the tape speed. A resulting signal can then be used to indicate the passage of a mark. Moreover, in the preferred embodiment, the interrecord mark 16, the BOT mark 11, and the EOT mark 12 are recorded with representations of predetermined bit patterns, so that other circuitry can discriminate them. All these marks can be detected and discriminated by relatively simple logic circuitry thereby to generate various control signals that are used in positioning the tape at a proper record location.

FIG. 1 discloses the basic components of a magnetic tape storage constructed in accordance with another aspect of this invention. They are the magnetic tape 10, a tape transport 20 that includes transports 20, a transport controller 30 including a transport control circuit 31 and data transfer circuitry including read/write circuit 32 that connect to a transducer 21 (FIG. 1). Referring first to the transport 20 shown in FIG. 1, spools, or reels, 22 and 23 carry the tape 10. The spools 22 and 23 are supported on drive spindles 24 and 25, respectively. The spindles are adapted to be rotated in either direction to cause the tape 10 to move past the transducer 21. A tape drive mechanism in the form of motor drivers, is also included in the tape transport 20 for driving the spindles 24 and 25 in response to commands from the transport controller 30. As the tape 10 moves past the transducer 21, read/write circuits 32 transfer, buffer, and store the data signals in accordance with instructions from the data processor 33.

Still referring to FIG. 1, the drive motor status and controller circuitry 31 comprise a servomechanism for controlling tape speed. This servomechanism includes a tachometer and velocity control circuit and a servo amplifier and drive select circuit that receive various signals from a control circuit 31 thereby to energize motor driver circuits of the transport 20 in an appropriate manner. In one specific embodiments, the drive motor status/controller circuit 31 responds to signals from the control circuit by moving the tape 10 in a forward or reverse direction and at a velocity of either 30 ips (inches per second) during a read/write mode or 60 ips during a seek mode.

Although not specifically shown, the transducer 21 may possess one or more read/write heads associated with each one or more respective data tracks on the magnetic tape medium 10. The read/write circuits 32 also include a head selection circuit through which signals pass from or to a selected head associated with one track on a tape. Normally the circuits 32 operate in a reading mode, so signals from a selected head 21 (FIG. 5C) are coupled through a read amplifier 51, a peak detector and decoder 52 and the control circuit 36 to "host" circuitry, such as a data processing system with which the magnetic tape storage system shown in FIGS. 1 and 7 coacts.

The methods of recording digital information signals on a magnetic medium may differ widely. A method that is known as ratio recording is particularly well suited for use with this invention, but other methods may also be used without departing from the scope of this invention. Ratio recording employs the use of variable duty cycles to differentiate between "ONEs" and ZEROes". Specifically, referring to FIGS. 3A and 3B, "ZEROes" and "ONEs," respectively, are defined by an electrical signal having approximately a 33 percent positive duty cycle, and an electrical signal having approximately a 67 percent positive duty cycle. The reading logic circuitry for interpreting the electrical signals includes the peak detector and decoder 52 shown in FIG. 5C. Specifically, an integrator circuit in an integrator and polarity detector 60 integrates a DATA IN signal from the peak detector 71 during each bit time. While the DATA IN signal is at a positive, or ONE, level, the integrator generates a signal of positive slope; when the DATA IN signal is at a ground, or ZERO, level, the integrator generates a signal of negative slope. As a result, the output of the integrator at the end of each bit time will be positive or negative depending upon the relative duty cycles, so the output is readily decoded as a ONE or ZERO merely by ascertaining the polarity of the output. The relationship of the input signals and output signals at the integrator for various read head signals from the transducer 21 is depicted in FIGS. 4A and 4B for signals corresponding to a bit stream "111000".

Sample timing is established at the positivegoing edge of the electrical signals from the peak detector 71 thereby obviating the necessity for providing a separate synchronization source to time the sampling intervals. Specifically, a data strobe generator 61 generates a data strobe pulse on the positive-going edge of each signal from the peak detector 71. Each data strobe pulse causes the output from the integrator for a previous bit time to be stored and clears the integrator so that it can begin to integrate during the succeeding bit time. The peak detector circuit 71 shown in FIG. 5C produces square wave signals that essentially correspond to the signals that were previously recorded on the recording medium.

Figure 3A:
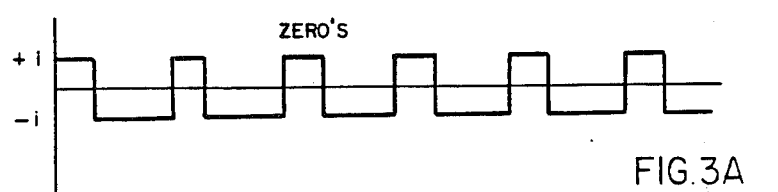
FIGS. 3A and 3B show examples of read/write circuit current levels that are recorded and played back for "zeroes" and "ones", respectively, for the work data contained in each record of the magnetic tape medium.
Figure 3B:
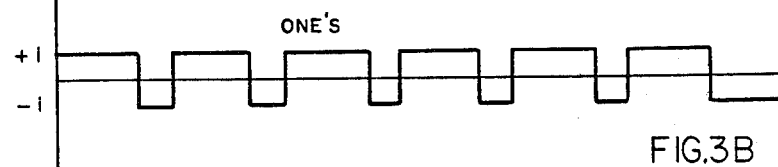
Figure 3C:
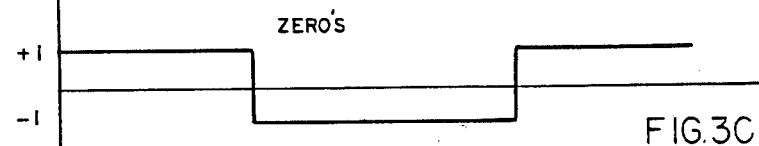
FIGS. 3C and 3D show examples of read/write circuit current levels that are recorded and played back for "zeroes" and "ones", respectively, for inter-record data signals, beginning-of-tape data signals, and data signals of a magnetic tape medium of a preferred embodiment of this invention.
Figure 3D:
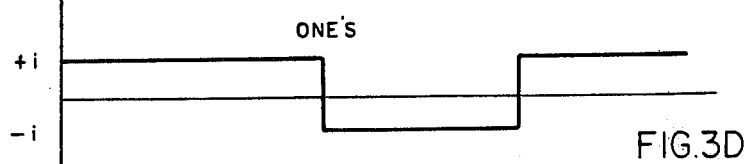

FIGS. 3A and 3B illustrate signals corresponding to a bit stream of ZEROes and ONEs respectively and represent the time interval for bits at the higher spatial bit density along the tape; that is, the relative frequency of signals produced when a record passes the transducer. FIGS. 3C and 3D illustrate signals from the peak detector 71 when a mark passes the transducer 21. A comparison of FIGS. 3A and 3B with FIGS. 3C and 3D illustrates the relative timing that is produced by the specifically disclosed differences in spatial bit density. It will be apparent that if FIG. 3A, for example, represents absolute frequency during the read/write mode, the frequency would double during the seek mode, assuming a 30 ips to 60 ips difference. However, the relationship between the marks and the records remains the same notwithstanding the tape velocity.

Figure 5A:
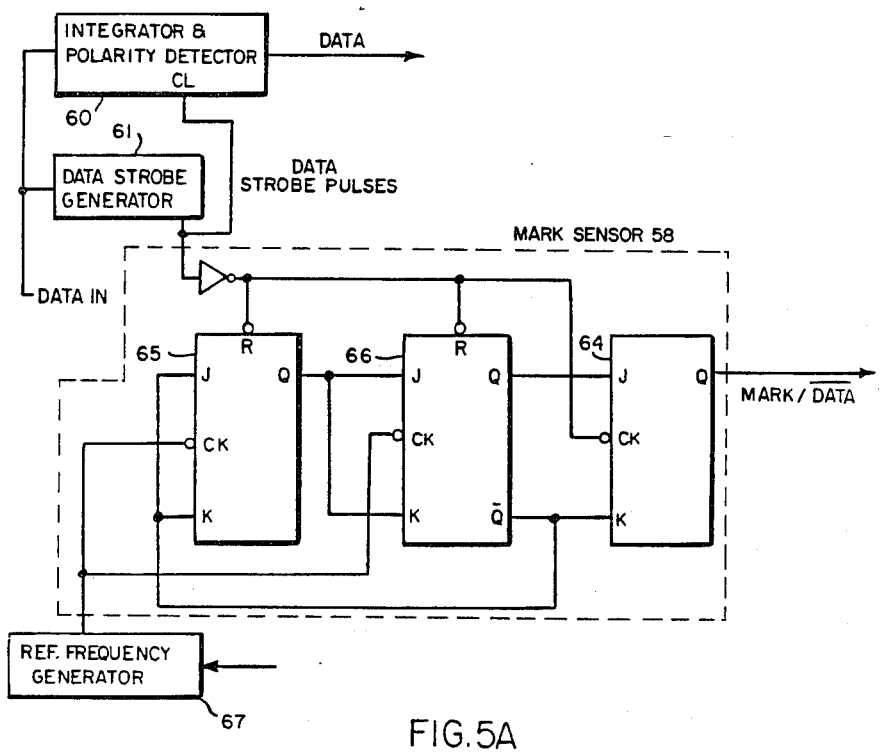
FIG. 5A shows one example of a logic circuit for detecting inter-record mark signals, beginning-of-tape data signals, and end-of-tape data signals for use in control of the tape drive.
Figure 6A:
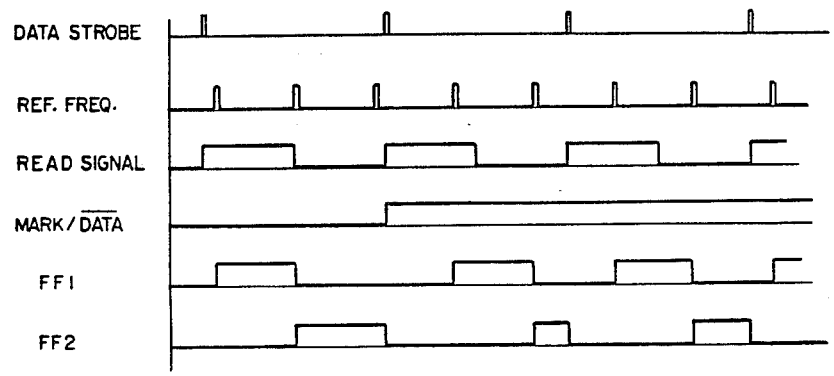
FIGS. 6A and 6B show, respectively, a timing chart that indicates certain of the signal levels of the circuit shown in FIG. 5A.
Figure 6B:
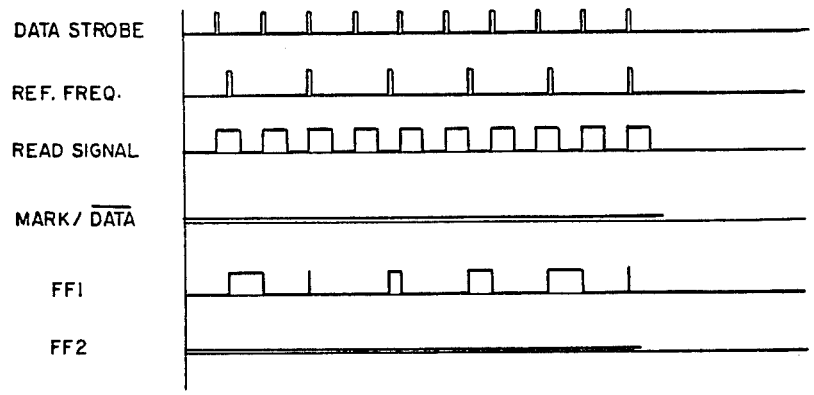

With the foregoing understanding of record format and signal recording techniques, an illustrative logic circuit for use in a tape drive system of our invention is shown in FIG. 5A. Corresponding timing diagrams are shown in FIGS. 6A and 6B that depict signal levels at various stages of the logic circuitry during the passage of low density and high density data, respectively.

During the reading of low density data in either the read/write mode or the seek mode, signals from the transducer 21 of FIG. 1 are supplied to the inputs of the integrator and polarity detector circuit 60 and the data strobe generator 61. The integrator and polarity detector circuit 60 performs the integration, as previously explained.

A mark sensor circuit 58 depicted in FIG. 5A, receives data strobe pulses from the data strobe generator 61 and reference frequency signals from a reference frequency generator 67. The frequency of signals from the generator 67 is dependent upon tape speed. Now referring to FIGS. 5A, 6A and 6B, each data strobe pulse clears flip-flops 65 and 66 and clocks a flip-flop 64. The flip-flops 65 and 66 constitute a modulo-two counter that controls the state of the flip-flop 64. The flip-flop 64 acts as a buffer and is clocked on the trailing edge of a data strobe. If a low density recording area passes the transducer, multiple reference frequency signals will be generated between data strobe pulses. This will enable the flip-flop 66 to set and enable the flip-flop 64 to set thereby indicating the passage of a mark. This relationship is shown in FIG. 6A. When high density recording areas pass the transducer, the relative frequencies of the data strobe and reference frequency pulses do not enable the flip-flop 64 to set. This is shown in FIG. 6B. Thus, the signal from the flip-flop 64 indicates whether a low or high density area is passing the transducer and constitutes a MARK signal. Moreover, the indication occurs during both read/write and seek modes of operation if the pulses from the reference frequency generator 67 are changed with tape speed.

Figure 5C:
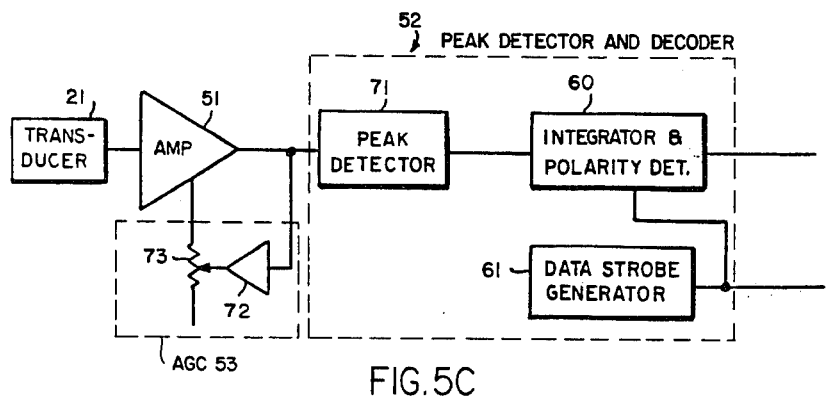
FIG. 5C depicts an automatic gain circuit employed by this invention that conditions the levels of the reading signals from the read/write heads.
Figure 5B:
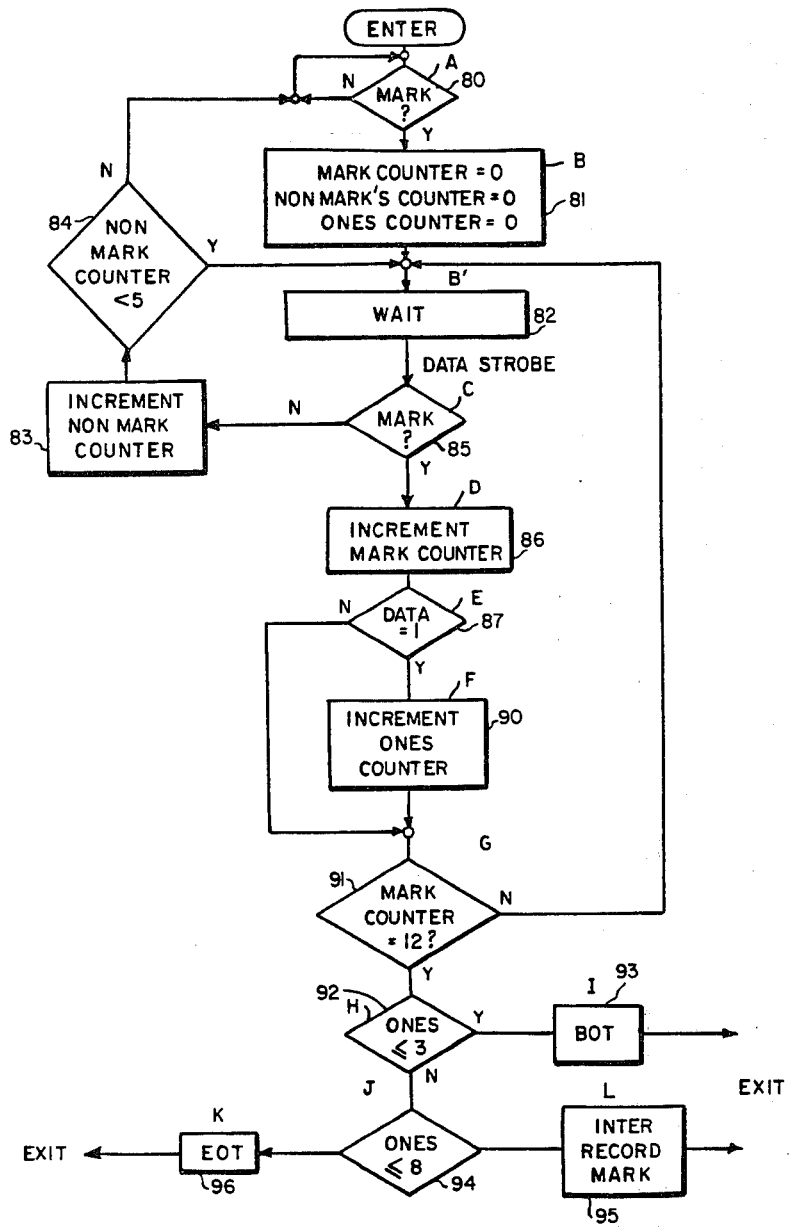
FIG. 5B shows a flow chart of the logic sequence that processes information in various marks.

The control circuit 31 (FIG. 1) operates in accordance with the flow chart shown in FIG. 5B to discriminate among the BOT, EOT and interrecord marks with reliability. Specifically, any time the mark sensor circuit 58 in FIG. 5A detects the passage of low density data in step 80, the data processor in the control circuit 36 initializes a mark counter, a non-mark counter and a ones counter in step 81. After a delay until the next data strobe pulse as represented by step 82, the signal from the flip-flop 64 in FIG. 5A is again tested. The flip-flop 64 may be cleared either because the tape has moved an area of high-density recording into the area of the transducer or because noise has been interpreted as an incoming signal. A test including steps 83 and 84 tends to filter out noise. Specifically, if the flip-flop 64 is cleared in step 85, the non-mark counter is incremented in step 83 and tested in step 84. In this embodiment, it is assumed that five consecutive non-mark tests will occur if a high-density area is encountered.

So long as signals from a low-density area are received, step 85 branches to step 86 whereupon the mark counter is incremented (step 86) thereby to record the number of mark data bits that have been received. In addition, if step 87 detects that the low-density signal represents a ONE, the ones counter is incremented in step 90. Step 91 controls the testing of steps 82 through 90 and continues that testing until twelve bits of information in a mark field have been received. Twelve bits are, in this embodiment, the number that are to be received in order to assume that a mark is being read.

The testing of the mark area is also performed to minimize the effects of noise. If three or fewer ONEs are received in step 92, an BOT field is detected (box 93). If step 94 detects between 4 and 8 ONEs, step 94 causes the control circuit 36 to interpret the mark as an interrecord mark (box 95). If 9 or more ONEs are detected, the mark is interpreted as an EOT mark (box 96). After the mark is interpreted, the central processor terminates its corresponding routine.

During operation, a counter also may be provided to keep track of the number of records that pass the transducer 21 during either the seeking or the read/write modes. The output of such a counter, in conjunction with a conventional down-counter or a comparator, provides the necessary control information for the processor in the control circuit 36 so that the tape drive may stop the tape, change tape speed, or reverse direction of the tape. With known position information, the processor may then locate a desired record.

In summary, the specific tape format shown in FIGS. 2A and 2B, the recording techniques described with respect to FIGS. 4A and 4B, the circuitry shown in FIGS. 5A and 5C and the timing in other figures are related to one embodiment of a method for detecting various mark signals that are useful for tape speed and direction control. The foregoing description is limited to a specific embodiment of this invention. It will be apparent, however, that this invention can be practiced in magnetic tape recording systems having diverse basic construction, diverse formatting schemes for magnetic tape medium, and different signal recording techniques than the system that is described in this specification, while attaining some or all of the foregoing objects and advantages. Therefore, it is the intent that the appended claims cover all such variations and modifications as come within the true spirit and scope of this invention.

What is claimed as new and desired to be secured by Letters Patent of the United States is:

1. A magnetic tape recording medium for storing digital data in a plurality of addressable record segments and for use in a magnetic tape storage device that includes tape transport means for moving said recording medium selectively at a first speed or at a second, slower, speed, control means connected to the tape transport means for controlling the speed at which said recording medium moves, transducer means connected to the control means for transferring representations of digital signals to and from said recording medium, and detecting means for detecting predetermined patterns of digital signals, said recording medium comprising:
   A. a plurality of prerecorded addressable record segments that store representations of digital signals at a first spatial bit density,
   B. prerecorded inter-record mark segments interposed between adjacent pairs of said record segments, each said mark segment storing a representation of a first predetermined pattern of digital signals at a second spatial bit density that is less than said first spatial bit density, and
   C. a prerecorded beginning-of-tape segment and a prerecorded end-of-tape segment at first and second portions of said recording medium, respectively, each of said beginning-of-tape and end-of-tape segments storing, respectively, representations of a second and third predetermined patterns of digital signals that are prerecorded at said second spatial bit density, said second and third predetermined patterns being marginally different from each other and marginally different from said first predetermined pattern of digital signals thereby to enable said detecting means to discriminate among passages of said mark segment, beginning-of-tape segment, and said end-of-tape segment even though some bits therein are erroneous.

2. A magnetic recording medium as recited in claim 1 wherein each record segment includes:
   i. prerecorded representations of synchronization data for synchronizing the transfer of data between said recording medium and the transducer means,
   ii. prerecorded representations of segment identifying data for identifying said addressable record segments,
   iii. prerecorded complementary segment identifying data that is the complement of said segment identifying data for verifying said segment identifying data, and
   iv. prerecorded representations of data that can be altered by the transducer means for storing the data.

3. A positioning system for a magnetic tape storage device that stores digital data for use in a data processing system, said positioning system comprising:
   A. magnetic recording medium that includes a plurality of prerecorded addressable record segments that store representations of digital signals at a first spatial bit density, and prerecorded inter-record mark segments interposed between adjacent of said record segments, each said mark segment storing a representation of a first predetermined pattern of digital signals at a second spatial bit density that is less than said first spatial bit density,
   B. transducer means for transferring data with said recording medium, and
   C. drive means for moving said recording medium relative to said transducer means at a first speed during record seeking operations and at a second, slower speed during data transfer operations, and
   D. control means connected to said transducer means and said drive means for relatively positioning said transducer means with respect to selected record segments thereby to facilitate the transfer of digital data with the data processing system, said control means including:
      i. data strobe means for generating data strobe pulses in response to information contained on said recording medium,
      ii. reference generator means for generating reference pulses having a predetermined reference frequency that is dependent upon the speed of the recording medium past said transducer means,
      iii. counter means connected to said reference frequency generator means and said data strobe means for counting said reference frequency pulses, said counter means being reset upon the occurrence of each data strobe pulse, and
      iv. mark signal means for generating mark signal when said counter means reaches a predetermined count between successive data strobe pulses while an area of low density passes said transducer means thereby to discriminate mark segments and record segments.

4. A positioning system as recited in claim 3 wherein said counter means comprises a modulo-two counter and said reference frequency signal has a frequency such that said counter reaches a predetermined count of two when said transducer means is positioned over said mark segments and fails to reach said predetermined count of two when said transducer means is positioned over record segments.

5. A positioning system as recited in claim 4 wherein said recording medium includes addressable record segments, each said record segment including:
   i. prerecorded representations of synchronization data for synchronizing the transfer of data between said recording medium and the transducer means,
   ii. prerecorded representations of segment identifying data for identifying said addressable record segments,
   iii. prerecorded complementary segment identifying data that is the complement of said segment identifying data for verifying said segment identifying data, and
   iv. prerecorded representations of data that can be altered by the transducer means for storing the data.

6. A positioning system as recited in claim 5 wherein said magnetic recording medium further includes:
C. a prerecorded beginning-of-tape segment and a prerecorded end-of-tape segment at first and second ends of said recording medium respectively, each of said beginning-of-tape and end-of-tape segments storing, respectively, a representation of a second and third predetermined pattern of digital bits that are recorded at said second spatial bit density.

* * * * *

UNITED STATES PATENT AND TRADEMARK OFFICE
CERTIFICATE OF CORRECTION

PATENT NO. : 4,321,632

DATED : March 23, 1982

INVENTOR(S) : Michael D. Leis et al

It is certified that error appears in the above-identified patent and that said Letters Patent are hereby corrected as shown below:

Column 4, line 14, after "and" insert -- end-of-tape --

Column 4, line 31, change "; and" to -- . --

Column 6, line 32, change "embodiments" to -- embodiment --

Column 6, line 58, change ZEROes" to -- "ZEROes" --

Column 10, line 29, change "generator" to -- frequency generator --

Signed and Sealed this

Fifteenth Day of June 1982

[SEAL]

Attest:

GERALD J. MOSSINGHOFF

Attesting Officer    Commissioner of Patents and Trademarks